(12) United States Patent
Caron

(10) Patent No.: US 9,766,957 B2
(45) Date of Patent: Sep. 19, 2017

(54) METHOD AND PROCESSES FOR SECURELY AUTOFILLING DATA FIELDS IN A SOFTWARE APPLICATION

(71) Applicant: McAfee, Inc., Santa Clara, CA (US)

(72) Inventor: Etienne Caron, Montreal (CA)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 15/026,908

(22) PCT Filed: Apr. 4, 2014

(86) PCT No.: PCT/CA2014/050344
§ 371 (c)(1),
(2) Date: Apr. 1, 2016

(87) PCT Pub. No.: WO2015/058293
PCT Pub. Date: Apr. 30, 2015

(65) Prior Publication Data
US 2016/0292020 A1    Oct. 6, 2016

Related U.S. Application Data

(60) Provisional application No. 61/894,639, filed on Oct. 23, 2013.

(51) Int. Cl.
*G06F 3/00* (2006.01)
*G06F 9/54* (2006.01)
*G06F 17/24* (2006.01)
*H04W 12/06* (2009.01)
*G06F 21/41* (2013.01)
*G06F 17/30* (2006.01)
(Continued)

(52) U.S. Cl.
CPC .............. *G06F 9/542* (2013.01); *G06F 9/54* (2013.01); *G06F 17/243* (2013.01); *G06F 17/3033* (2013.01); *G06F 17/30528* (2013.01); *G06F 21/41* (2013.01); *G06F 21/602* (2013.01); *H04W 12/06* (2013.01); *G06F 8/61* (2013.01); *H04L 63/0815* (2013.01); *H04W 88/02* (2013.01)

(58) Field of Classification Search
CPC ........................................................ G06F 9/542
USPC ....................................................... 719/318
See application file for complete search history.

(56) References Cited

U.S. PATENT DOCUMENTS

| | | | |
|---|---|---|---|
| 7,778,870 B1 * | 8/2010 | Kriza | ..................... G06Q 30/02 705/14.16 |
| 2014/0082694 A1 * | 3/2014 | Sanghavi | ................. G06F 21/31 726/3 |
| 2014/0082715 A1 | 3/2014 | Grajek et al. | |

FOREIGN PATENT DOCUMENTS

CA    2799051 A1    8/2013

OTHER PUBLICATIONS

Benjamin Rutt, Distributed Dynamic Event Tree Generation for Reliability and Risk Assessment, 2006.*

* cited by examiner

*Primary Examiner* — Lechi Truong
(74) *Attorney, Agent, or Firm* — Blank Rome, LLP

(57) ABSTRACT

The present invention gives the methods and processes for automatically servicing user driven requests to find placeholder fields, fill them in with relevant data in a secure manner and securely communicating the data related thereto to the appropriate Android™ device and/or application. More particularly, it relates to the methods and processes for authenticated users to automatically obtain and use the correct filled-in data that allows them to access or use any of a multiple number of Android™ applications and/or services at any time.

20 Claims, 3 Drawing Sheets

(51) Int. Cl.
  *G06F 21/60* (2013.01)
  *H04L 29/06* (2006.01)
  *H04W 88/02* (2009.01)
  *G06F 9/445* (2006.01)

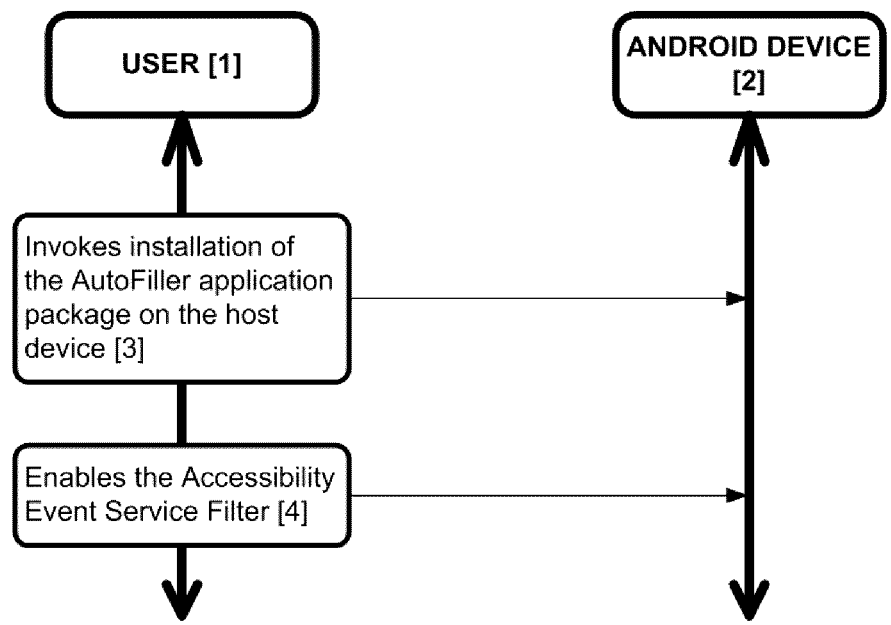
Figure 1: Application Installation and Launch

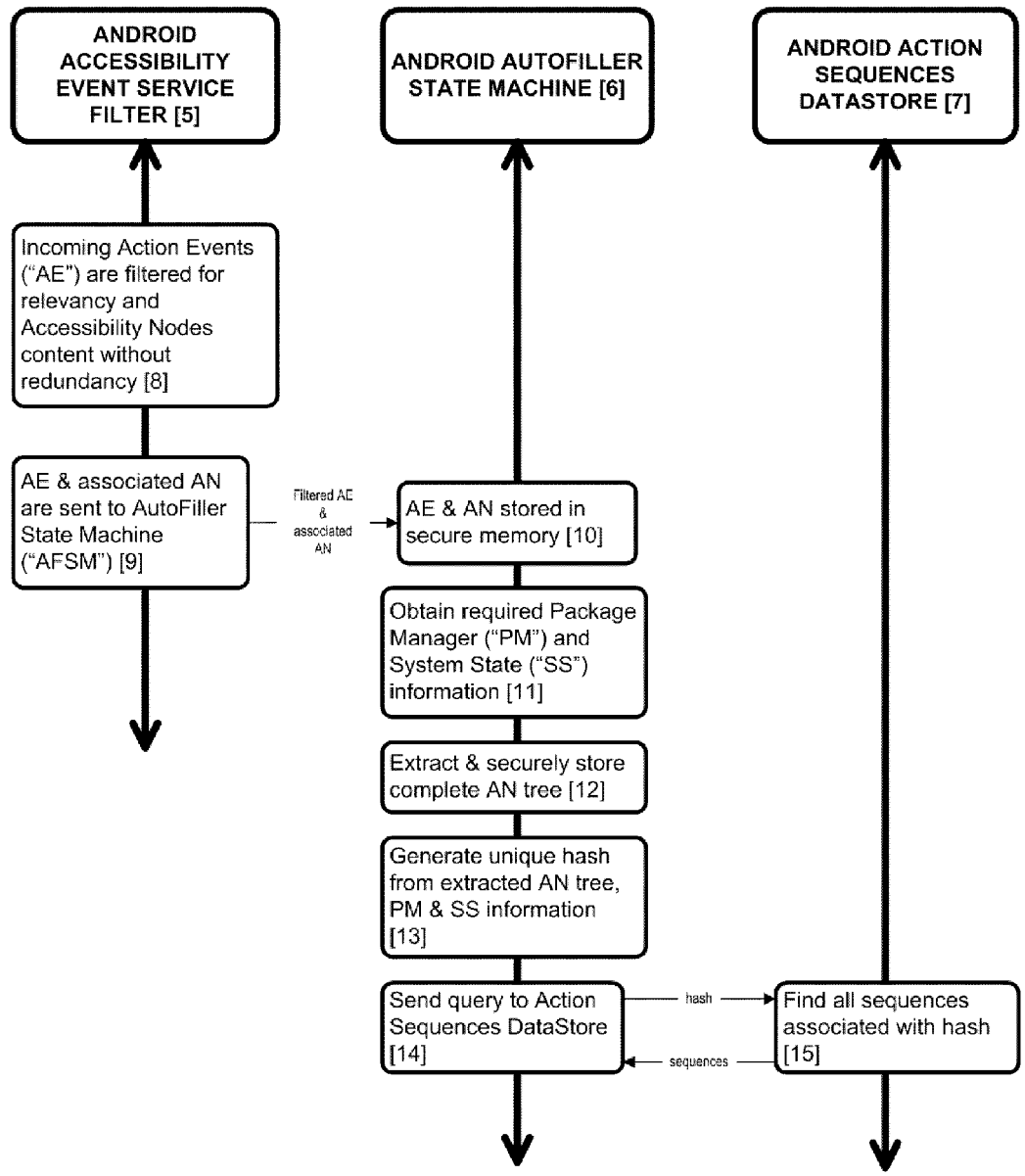
Figure 2: Event Relevancy and Action Node Build for Action Sequence Lookup

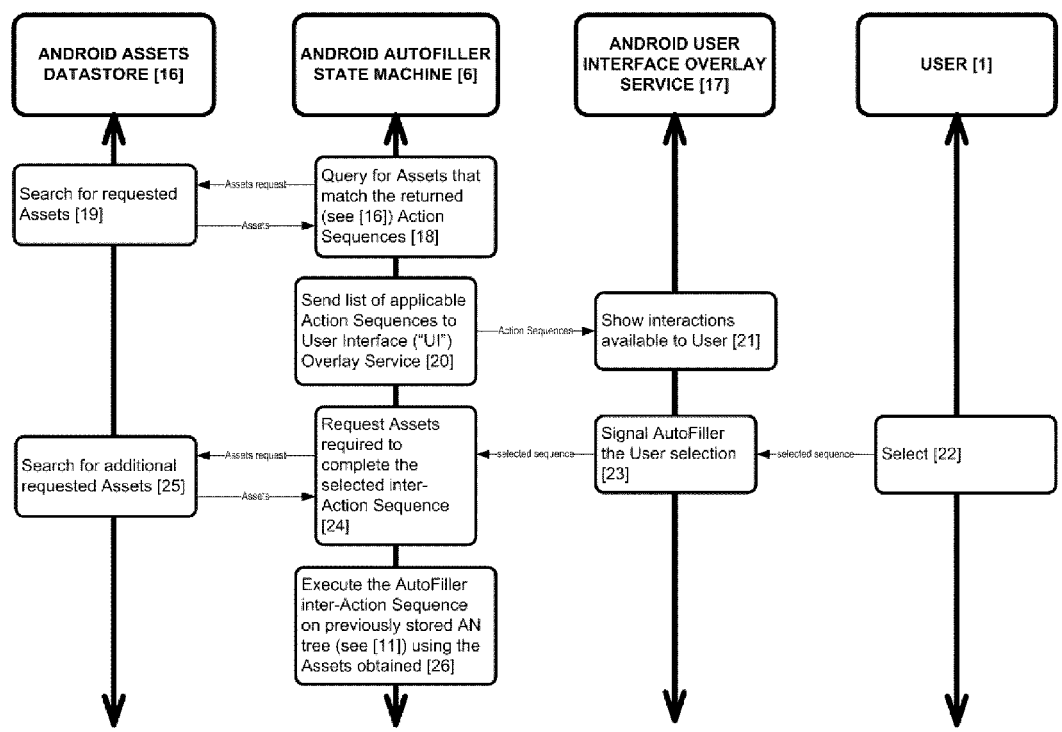
Figure 3: Available User Selections and System Actions

METHOD AND PROCESSES FOR SECURELY AUTOFILLING DATA FIELDS IN A SOFTWARE APPLICATION

FIELD

The present invention generally relates to the use of Android™ based systems and the methods and processes for automatically servicing user driven requests to find placeholder fields, fill them in securely with relevant user data and securely communicating the data related thereto to the appropriate device and/or application. More particularly, it relates to methods and processes for authenticated users to automatically fill in data that allows them to automatically access or use any of a multiple number of Android™ applications or services.

BACKGROUND

Many Android™ applications require, at the least, a user name and password, and possibly information of greater syntactic and semantic depth and breadth to access data or applications on one or more Android™ systems. Also users may have more than one account per Android™ application. For an authenticated user to access such applications and the data associated therewith he/she usually adopts substantially similar means for most if not all applications and accounts. Moreover, users tend to store the key information related thereto on third party accessible lists. Today, more websites and applications are generally insisting on the use of stronger usernames and passwords as well as layers of information and interaction before allowing access to, one or another part of, their application and data by a user. Moreover, websites and applications change their logging methods and processes from time-to-time to assure that only credible human users are allowed access. This makes access and retrieval secure but frustrating for the user.

Once a user is properly authenticated, to protect against undesired intrusion and manipulation whilst assuring that legitimate users can seamlessly access applications and data, a program that automatically and securely finds placeholder fields and data types and then securely fills in the necessary information is required. The methods and processes defined herein address this problem.

U.S. Pat. No. 6,651,217 to Kennedy et al. discloses a system and method for populating a plurality of fields in an HTML based form rendered on a browser. Upon submittal of an inventive form, a web browser determines whether the user has completed any commonly used fields. If the fields have not been previously filled, data values are extracted and stored for future use.

U.S. Pat. No. 7,254,569 to Goodman et al. discloses a system and method that employs machine learning techniques to automatically fill fields across a variety of web forms. In this way, the machine "learns" which data corresponds to particular fields. This learned information can be sent to a central database where it is aggregated with data collected from other users, resulting in a predictive method.

U.S. Pat. No. 7,953,597 to Ativanichayaphong et al. discloses a method and system for filling a graphical form in response to received speech input. This method includes generating grammar that corresponds to the form field, is based on a user profile and comprising a semantic interpretation string. The method creates an auto-fill event based on the generated grammar and a received speech utterance.

U.S. Pat. No. 8,234,561 to Bourdev discloses systems and techniques for autocompleting form fields based on observed values. This includes observing values entered in form field object and generating likelihood assessments for possible values to be entered in a current from field based on these observed values. These likelihood assessments indicate the relative probability of the possible values being entered in the current form field object and predicting a value for the current form field object based on the results of this assessment.

US Publication No. 2013/0104022 to Coon discloses a method for auto-filling information wherein a website is accessed on a device and a plurality of fields are analyzed, the location of the device is determined, and at least one field is filled with user information based on the location of the device.

Accordingly, there is need for methods and processes for automatically servicing user driven requests to find placeholder fields, fill them in with relevant data in a secure manner and securely communicated the data related thereto to the appropriate Android™ devices and/or applications. More particularly, there is need for methods and processes that allow authenticated users to automatically obtain and use the correct filled-in data that allows them to access or use any of a multiple number of Android™ applications and/or services.

This background information is provided as information believed by the applicant to be of possible relevance to the present invention. No admission is necessarily intended, nor should be construed, that any of the preceding information constitutes prior art against the present invention.

DESCRIPTION OF THE DRAWINGS

The features and advantages of the invention will become more readily apparent from the following description, reference here is being made to the accompanying drawings in which:

FIG. 1 is a flow diagram illustrating at least one embodiment of the process by which the Automatic Filler software ("AutoFiller") is installed onto the Android™ device, configured and launched;

FIG. 2 is a flow diagram illustrating at least one embodiment of the process by which Accessibility Events ("AEs") that are generated by the Android™ device are filtered according to their relevancy and, along with their associated Accessibility Nodes ("ANs"), are stored for possible future user invoked tasks. Also illustrated here is how the same AEs are used to determine which AutoFiller Action Sequences are available for any given device state; and FIG. 3 is a flow diagram illustrating at least one embodiment of the process by which users are given a choice of possible and available AutoFiller Action Sequences for the user to make their choices and then how the chosen Action Sequence is automatically executed by AutoFiller.

DETAILED DESCRIPTION OF THE EMBODIMENTS

The present invention provides, in at least one embodiment, methods and processes for automatically servicing user driven requests to find placeholder fields, filling them in with relevant data in a secure manner and securely communicating the data related thereto to the appropriate Android™ devices and/or applications. More particularly, in at least one embodiment the present invention provides methods and processes for authenticated users to automatically obtain and use the correct filled-in data that allows them to access or use any of a multiple number of Android™ applications and/or services.

In at least one embodiment, there is provided a method for installing an AutoFiller, filtering any Accessibility Events and their related Accessibility Nodes and, under User control choosing the action sequences to be executed by Auto-Filler which automatically fills in information such as, but not limited to, user names and passwords.

In at least one embodiment a method of filtering an accessibility event with an accessibility event service filter on an Android device in order to generate an action sequence comprising the steps off filtering an incoming accessibility event, with the incoming accessibility event including at least one accessibility node; determining the relevancy of the incoming accessibility event based on at least one previously adopted rule; and if the incoming accessibility event is determined to be relevant; securely sending the incoming accessibility event to an autofiller state machine; extracting at least one accessibility node from the incoming event with the autofiller state machine; securely storing the incoming accessibility event and the at least one accessibility node in secure memory; extracting an accessibility node tree from the accessibility node; retrieving any relevant application programmer interface data from an application program interface; securely storing the accessibility node tree and relevant application programmer interface data; securely querying an action sequences datastore; and securely retrieving at least one action sequence from the action sequences datastore based on the query, and whereby querying and retrieving remotely can be further protected by a use of a secure tunnel.

(1) Definitions

The following definitions will be used throughout the following specification:

(1.1) Android™ Platform Related Terms

Accessibility Event ("AE"): An accessibility event is an event which is fired by an individual View which populates the event with data for its state and requests from its parent the instructions to send the event to interested parties. It is contemplated that examples of Accessibility Events can include, but are not limited to, views being clicked, text editing events, long sequence click events, window state change events, exploration events, window content change events, view focussed events, user identity initiation and confirmation events, various transaction invocation and confirmation events, announcement, gesture/speech detection start, gesture/speech detection end, notification state changed, touch exploration gesture end, touch exploration gesture start, touch interaction end, touch interaction start, view accessibility focused, view accessibility focus cleared, view clicked, view focused, view hover enter, view hover exit, view long clicked, view scrolled, view selected, view text changed, view text selection changed, view text traversed at movement granularity, window content changed and window state changed, among other types of Accessibility Events that will be readily understood by the skilled person.

Accessibility Node ("AN"): A node of the View content as well as the actions that can be requested from its source.

Accessibility Service: An accessibility service runs in the background and receives callbacks by the Android™ system when Accessibility Events are fired. Such service events denote some state transition in the user interface, for example, the focus has changed, a button has been clicked, among other state transitions that will be readily understood by the skilled person. Such a service can optionally request the capability for querying the content of the active window.

API: Application programmer's interface.

Interested Parties: Interested parties could be, for example, the User, authorized applications running on the device and/or authorized active windows open on the Android™ device, among other Interested Parties that will be readily understood by the skilled person.

Package Manager: An API for retrieving any type of information related to the application packages currently installed on the Android™ device.

System Information: The API for retrieving any type of information about the Android™ device on which a program is executing.

View: A View represents the basic building block for User Interface components. A View occupies a rectangular area located anywhere on the screen and is responsible for drawing and event handling.

(1.2) Terms Related to Custom Components for the Android™ Platform AutoFiller Machine Accessibility Event Service Filter: A software program responsible for receiving Accessibility Events and filtering these events so that one only processes the Events that are relevant to this Android™ System in its current state.

Action Sequence: A coded sequence of actions to be carried out.

Action Sequence Datastore: Describes a service, on board the Android™ device or remotely accessible, that software components can call on to securely save and load action sequences and related data.

Assets: Any piece of data that can be used by an Action Sequence to complete its list of tasks. In at least one embodiment, assets can include but are not limited to user credentials, usage statistics, personal information, among other arrangements that will be readily understood by the skilled person.

Assets Datastore: Describes a service, that can be provided directly on board the Android™ device or from a remotely accessible location, that software components can call on to securely save and load assets and related data. In at least one embodiment, the Assets Datastore is a remotely accessible, secure server database, however other arrangements are readily contemplated by the skilled person.

AutoFiller State Machine: Autofiller State Machine is a software program in charge of keeping track of any current and potential relevant Android™ device states which in one embodiment tracks if the target is available for receiving an action sequence or that a target is not available for receiving an action sequence. In other embodiments the Autofiller State Machine can consider a wide variety of Android device states when determining which action sequence that is best associated with the particular accessibility event. Based on this information, the State Machine will offer a selection of Action Sequences to be triggered by the User. It is also responsible for launching selected Action Sequences. The State Machine can also keep all events synchronized, protects against race conditions and otherwise makes sure that asynchronous interactions occur in the right order through queuing and other related methods.

Credentials: That information which is required to authorize access to an Application's functions and features. In at least one embodiment, credentials include, but are not limited to, information such as usernames, passwords, email address(es), received email data, biometrics, tags, credit cards, identifying documents, various signatures, memos that help users distinguish between different sets of Credentials, among other arrangements that will be readily understood by the skilled person.

Datastore: The Datastore is a service having a secure repository, either on board the Android™ device or in a remotely accessible location, where an application can save secure data as well as un-secure data the latter of which requires no protection. In at least one embodiment, the Datastore is a remotely accessible, secure server database, however other arrangements are readily contemplated by the skilled person.

User Interface Overlay: A user interface which is overlaid on top of part or all of the User Interface on the Android™ device.

User Interface Overlay Service: A software program responsible for reacting to User input, notifying other components when relevant, and reacting to events triggered by other software components. For instance, if the AutoFiller State Machine needs to close or update the User Interface Overlay.

The invention will now be described with reference to specific examples. It will be understood that the following examples are intended to describe embodiments of the invention and are not intended to limit the invention in any way.

(2) Examples

In at least one embodiment, the present invention provides a novel multi-form access on Android™ devices. This method installs an AutoFiller state machine on an Android™ device and proceeds to filter any Accessibility Events and their related Accessibility Nodes. Then, under User control, it selects the Action Sequences to be executed by AutoFiller such as, but not limited to, automatically filling in user names and passwords. In this embodiment there are two Datastores, the Assets Datastore and the Action Sequence Datastore. They, in conjunction with the User Interface Overlay Service and the Accessibility Service, are organized to work in symbiotic-concerted interaction to offer one consistent and uniform user experience for the Android™ platform.

Although the invention is described in terms of specific illustrative embodiment(s), it is to be understood that the embodiment(s) described herein are by way of example only and that the scope of the invention is not intended to be limited thereby.

Referring to FIG. 1, which is a flow diagram illustrating at least one embodiment of the process by which a User [1] installs the AutoFiller package [3] on his/her Android™ device [2]. Typically this would be included in a standard Android™ application package, but could also be a distinct modular application package, among other arrangements that will be readily contemplated by the skilled person. The User [1] then enables the Accessibility Event Service Filter on the device [3]. While enabled, the Accessibility Event Service Filter (see [5] in FIG. 2) will be receiving Accessibility Events that it registered with the Android™ device.

Referring to FIG. 2, is a flow diagram illustrating at least one embodiment of the process by which the Android™ Accessibility Event Service Filter [5] acts upon the incoming Accessibility Events by first filtering these events for relevancy which includes therein their associated Accessibility Nodes [8]. The device can get many types of events, including but not limited to views being clicked, text editing events, long sequence click events, window state change events when new dialogs or menus are shown, exploration events when users click and drag their fingers on the screen, among other events that will be readily appreciated by the skilled person.

Relevancy can be based at least in part on whether or not a given Accessibility Event reflects a change in the View of the application shown to the User and, whether or not this Event is a functional duplicate of an Event already received in the past. Relevancy can also vary based on other factors since it is not limited to System Information and Package Manager Information, as will be readily understood by the skilled person. If the filter determines that a given Event and its associated Accessibility Nodes are relevant [8] based on the rules adopted, it then sends the information to the AutoFiller State Machine [9] for processing via secure memory [10]. By 'secure memory' one means any method by which information in memory cannot be usefully accessed, within a given time span, by any third party application.

As will be appreciated by the skilled person, a wide variety of rules can be adopted to determine the relevancy of a given Accessibility Event based on the prerequisites of a given embodiment of the present invention. For example, a rule may be selected stating that multiple identical user inputs detected concurrently in a short period of time are irrelevant and as such this particular Accessibility Event (i.e.: multiple identical user inputs, or alternatively, all subsequent identical user inputs detected after an identical initial user input) is determined irrelevant based on the adopted rules. Alternatively, a rule could be selected stating that only window content change events (or alternatively, any other type of agreed to known Accessibility Events) can be determined to be relevant based on the adopted rules.

Many other types of rules are contemplated that will be readily understood by the skilled person, including but not limited to rules that require additional contextual information regarding the particular Accessibility Event (such as for example, geographic location of the user at the time of Accessibility Event execution) or alternatively the rule can be selected based on the historical actions of the user or that of the particular device when accessing a particular software application.

Further and as will be understood by the skilled person, Accessibility Events deemed irrelevant based on the adopted rules can be wholly disregarded or, alternatively, sent to the Autofiller State Machine [6] as deemed appropriate in the particular embodiment of the present invention.

Next, the AutoFiller State Machine [6] will extract an Accessibility Node from the received Accessibility Event. The State Machine securely stores the Event and the extracted Node [10]. The AutoFiller State Machine then consults with the device's Package Manager and the device's System State information API to obtain API data and securely stores that information as well [11]. The AutoFiller State Machine then inspects the Accessibility Node and extracts from it a complete Accessibility Node tree [12].

From this information a unique hash key, or other unique identifier, can then be generated in at least one embodiment [13] using one or more of the following items:
the extracted Accessibility Node tree;
the information extracted from the Android™ APIs including but not limited to the Package Manager and the System Information API; and/or
a null set.

An example of the information available for extraction by the Android™ APIs, and which in some embodiments can be used to generate this hash key, can include but is not limited to: system date and time of the device, physical orientation of the device, network connectivity state, application packages installed on the device, package name of currently active application, among other arrangements that will be readily understood by the skilled person.

In some embodiments, the generated hash key can serve as a unique identifier as to which application is currently running on the Android™ device and the state of the device's user interface. In some embodiments, this generated hash key can then be used to query [14] the Action Sequences Datastore [7]. The query will return, if found, one or many Action Sequences that are available for a given context [15]. Alternatively, in other embodiments a query is not performed and an Action Sequence previously associated with a particular context is directly executed.

The Action Sequence (either directly associated with a particular context or alternatively queried and retrieved from the Action Sequences Datastore [7]) may or may not be entropy coded and/or encrypted as the situation (i.e., based on data size, data redundancy, secure data types or data types not requiring additional security) may require ([15] to [14]).

In other embodiments, the Action Sequences Datastore [7] can be queried using an Action Sequences prefilter. It is contemplated that the Action Sequences prefilter can be based, in at least one embodiment, on predetermined metadata that can be extracted from the detected Action Sequences and selected based on the needs of the particular embodiment of the present invention. It is also contemplated that both the Action Sequences prefilter and the hash key can be used to query the Action Sequences Datastore [7], among other arrangements that will be readily understood by the skilled person.

Referring to FIG. 3 which is a flow diagram illustrating at least one embodiment of the process by which one makes a request for assets [18], from the Android™ Autofiller State Machine [6] to the Android™ Assets Datastore [16], associated with the Action Sequences that were previously found (see [15] in FIG. 2). The Assets ([19] to [18]) may or may not be entropy coded and/or encrypted as mentioned above. Based on whether or not there are Assets available for a given Action Sequence (see [15] in FIG. 2), the list of sequences and information of which applicable Assets are available [20] is sent to [21] the Android™ User Interface Overlay Service [17]. The User Interface Overlay Service will then show a list of available interactions to the User [21]. The User [1] then selects the sequence or those sequences that are appropriate for them [22]. It is also contemplated that a time out sequence can be initiated should the User fail to select an appropriate sequence within a predetermined time frame.

The User Interface Overlay Service [17] will signal to the AutoFiller State Machine [6] the User's chosen sequence [23]. Upon receiving this signal [24], the AutoFiller State Machine [6] will query the Assets Datastore [16] for the Assets related to the selected Action Sequence [25]. These Assets may or may not be entropy coded and/or encrypted ([25] to [24]) as indicated in previous cases above. The AutoFiller State Machine [26] will then execute the Action Sequence onto the Accessibility Nodes, using the returned Assets as and where needed.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A method of filtering an accessibility event comprising the steps of:
   filtering an incoming accessibility event, the incoming accessibility event including at least one accessibility node;
   determining relevancy of the incoming accessibility event based on at least one previously adopted rule;
   sending the incoming accessibility event to an autofiller state machine;
   extracting at least one accessibility node from the incoming accessibility event with the autofiller state machine;
   storing the incoming accessibility event and the at least one accessibility node in memory;
   extracting an accessibility node tree from the accessibility node;
   retrieving application programmer interface data from an application program interface relevant to the incoming accessibility event;
   storing the accessibility node tree and the application programmer interface data; and
   executing at least one action sequence.

2. The method of claim 1, wherein executing at least one action sequence further comprises the step of:
   querying an action sequences datastore; and
   retrieving the at least one action sequence from the action sequences datastore.

3. The method of claim 2, wherein the querying, the retrieving, the sending and the receiving can be protected by use of a secure tunnel.

4. The method of claim 2, further comprising generating at least one of a hash key and a unique identifier, based on at least one of the accessibility node tree, the application programmer interface data, and a null set.

5. The method of claim 4, wherein querying the action sequences datastore is based on at least one of the hash key and the unique identifier.

6. The method of claim 2, wherein querying the action sequences datastore is based on an action sequence prefilter.

7. The method of claim 6, wherein the action sequence prefilter is based on predetermined metadata.

8. The method of claim 1, wherein the accessibility event is selected from the group consisting of:
   views being clicked,
   text editing events,
   long sequence click events,
   window state change events,
   exploration events,
   window content change events,
   view focused events,
   announcements,
   user identity initiation and confirmation events,
   various transaction invocation and confirmation events,
   gesture/speech detection start,
   gesture/speech detection start,
   gesture/speech detection end,
   notification state changed,
   touch exploration gesture end,
   touch exploration gesture start,
   touch interaction end,
   touch interaction start,
   view accessibility focused,
   view accessibility focus cleared,
   view clicked,
   view focused,
   view hover enter, view hover exit,
view long clicked,
view scrolled,
view selected,
view text changed,
view text selection changed,
view text traversed at movement granularity,
window content changed, and
window state changed.

9. The method of claim 1, wherein the application programmer interface data is selected from the group consisting of:
package manager data,
system information data,
system time data,
physical orientation data,
network connectivity data,
installed application package data, and
currently active application data.

10. The method of claim 1, wherein the at least one action sequence is entropy coded and based on at least one of data size and data redundancy.

11. The method of claim 1, wherein the at least one action sequence is encrypted.

12. The method of claim 11, wherein the encryption is based on at least one of data size and data redundancy.

13. The method of claim 1, wherein at least one of the incoming accessibility event, the accessibility node, the accessibility node tree and the application programmer interface data are stored in a secure manner.

14. A non-transitory machine readable medium having instructions for filtering an accessibility event stored thereon, the instructions comprising instructions that when executed cause a machine to:
filter an incoming accessibility event, the incoming accessibility event including at least one accessibility node;
determine relevancy of the incoming accessibility event based on at least one previously adopted rule;
send the incoming accessibility event to an autofiller state machine;
extract at least one accessibility node from the incoming accessibility event with the autofiller state machine;
store the incoming accessibility event and the at least one accessibility node in memory;
extract an accessibility node tree from the accessibility node;
retrieve application programmer interface data from an application program interface relevant to the incoming accessibility event;
store the accessibility node tree and the application programmer interface data; and
execute at least one action sequence.

15. The machine readable medium of claim 14, wherein the instructions that when executed cause the machine to execute at least one action sequence comprise instructions that when executed cause the machine to:
query an action sequences datastore;
retrieve the at least one action sequence from the action sequences datastore.

16. The machine readable medium of claim 14, wherein the querying, the retrieving, the sending and the receiving can be protected by use of a secure tunnel.

17. The machine readable medium of claim 14, wherein the at least one action sequence is entropy coded and based on at least one of data size and data redundancy.

18. The machine readable medium of claim 14, wherein the at least one action sequence is encrypted.

19. The machine readable medium of claim 14, wherein at least one of the incoming accessibility event, the accessibility node, the accessibility node tree and the application programmer interface data are stored in a secure manner.

20. An apparatus for filtering an accessibility event, comprising:
a memory storing instructions for filtering an accessibility event; and
a processor operatively coupled to the memory and adapted to execute the instructions stored in the memory to cause the processor to:
filter an incoming accessibility event, the incoming accessibility event including at least one accessibility node;
determine relevancy of the incoming accessibility event based on at least one previously adopted rule;
send the incoming accessibility event to an autofiller state machine;
extract at least one accessibility node from the incoming accessibility event with the autofiller state machine;
store the incoming accessibility event and the at least one accessibility node in memory;
extract an accessibility node tree from the accessibility node;
retrieve application programmer interface data from an application program interface relevant to the incoming accessibility event;
store the accessibility node tree and the application programmer interface data; and
execute at least one action sequence.

* * * * *